June 23, 1970     A. H. MOORE ET AL     3,517,185
RECHARGEABLE FLASHLIGHT AND RECHARGING STAND
Filed Jan. 15, 1968     4 Sheets-Sheet 4
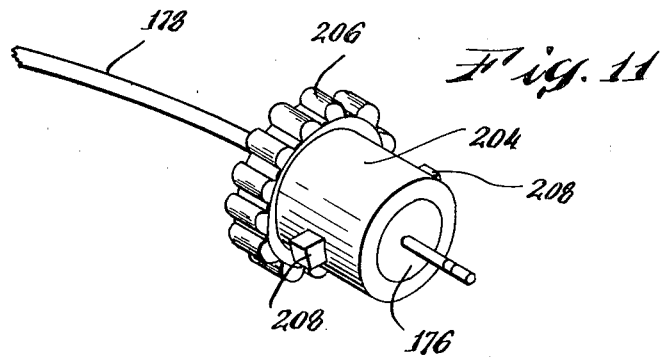
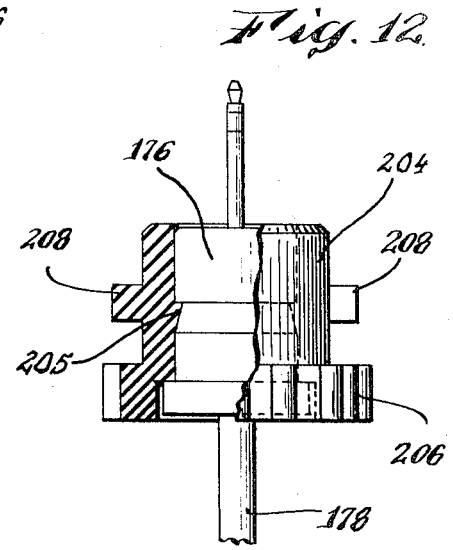
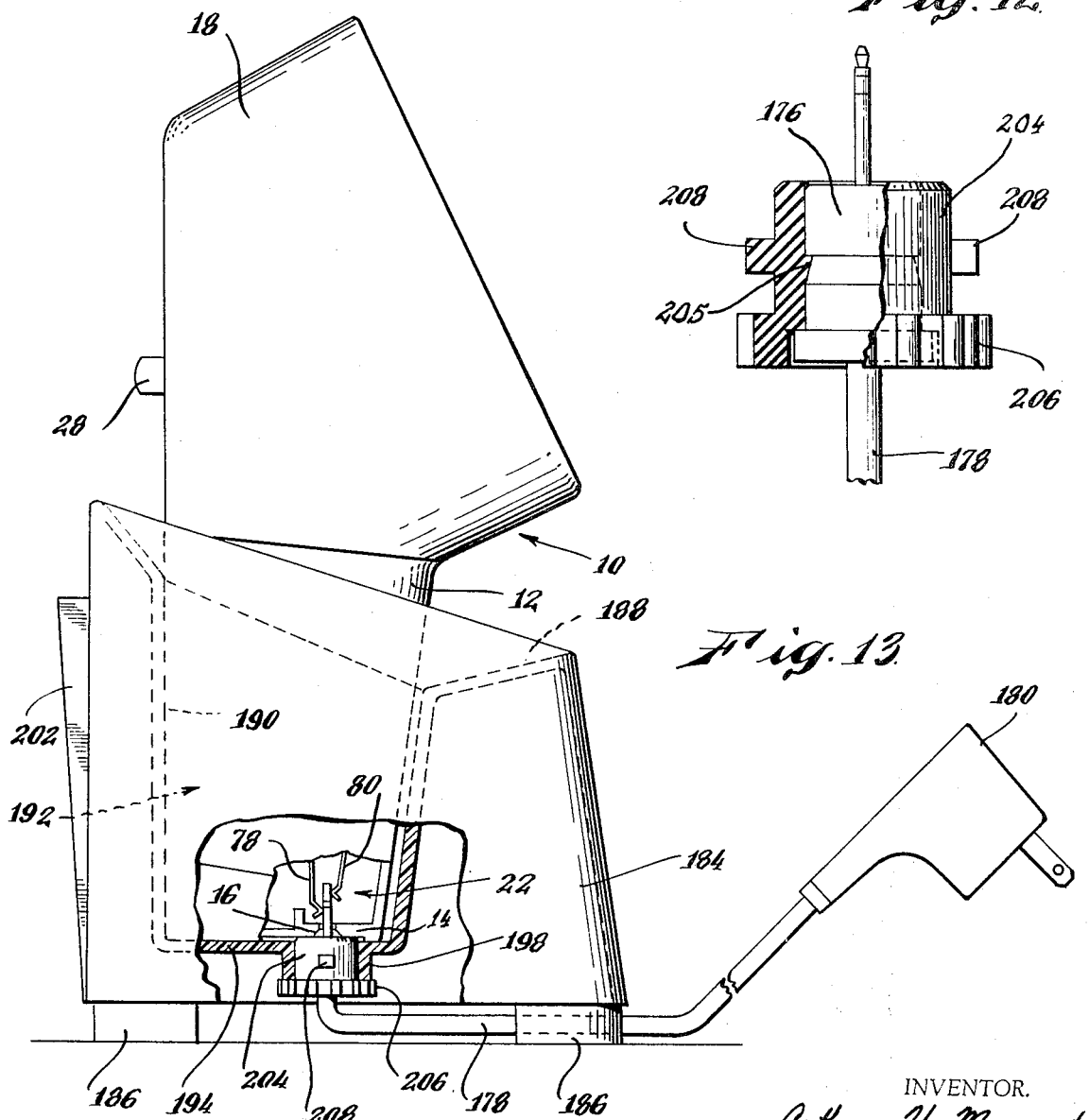

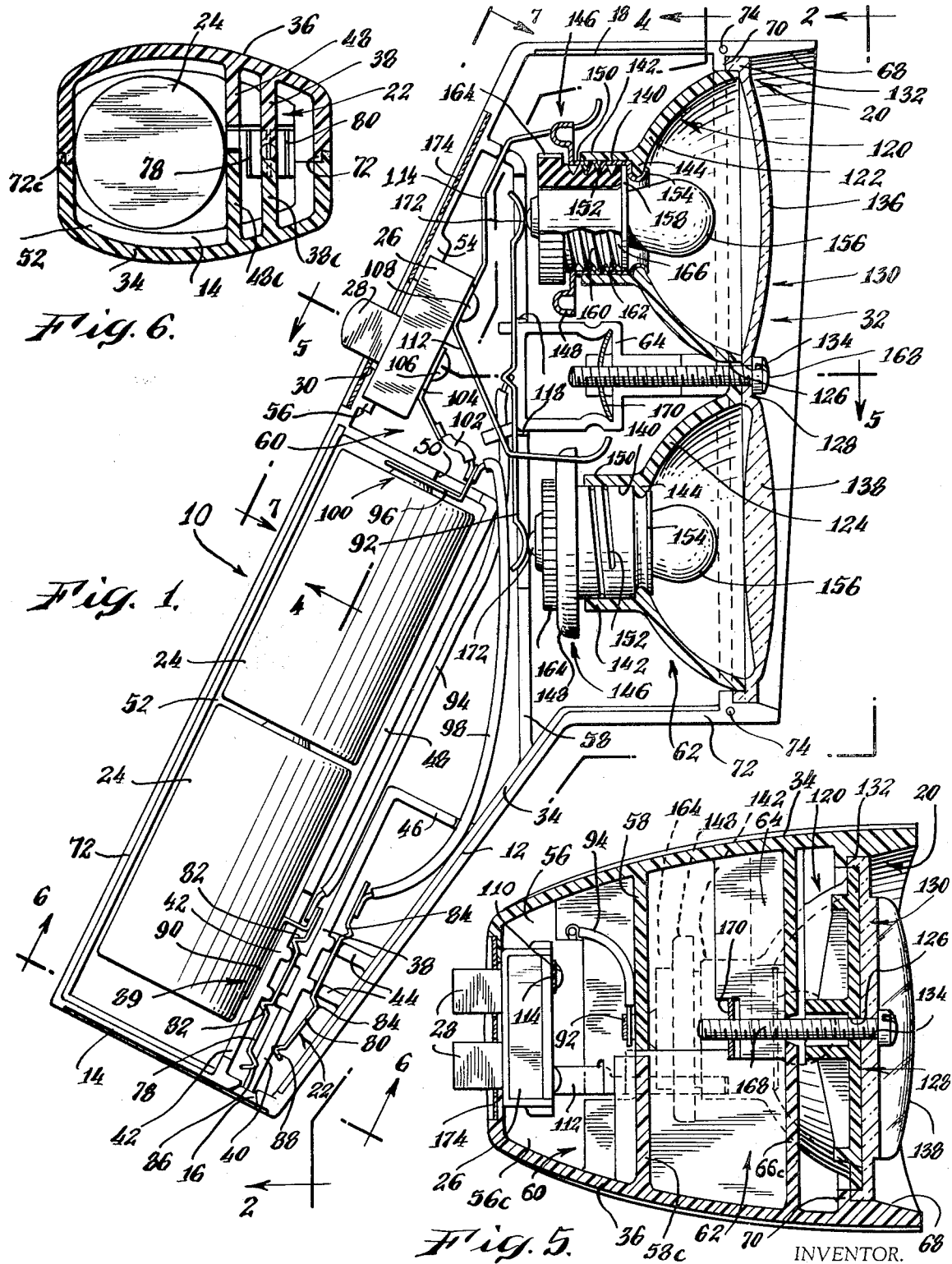

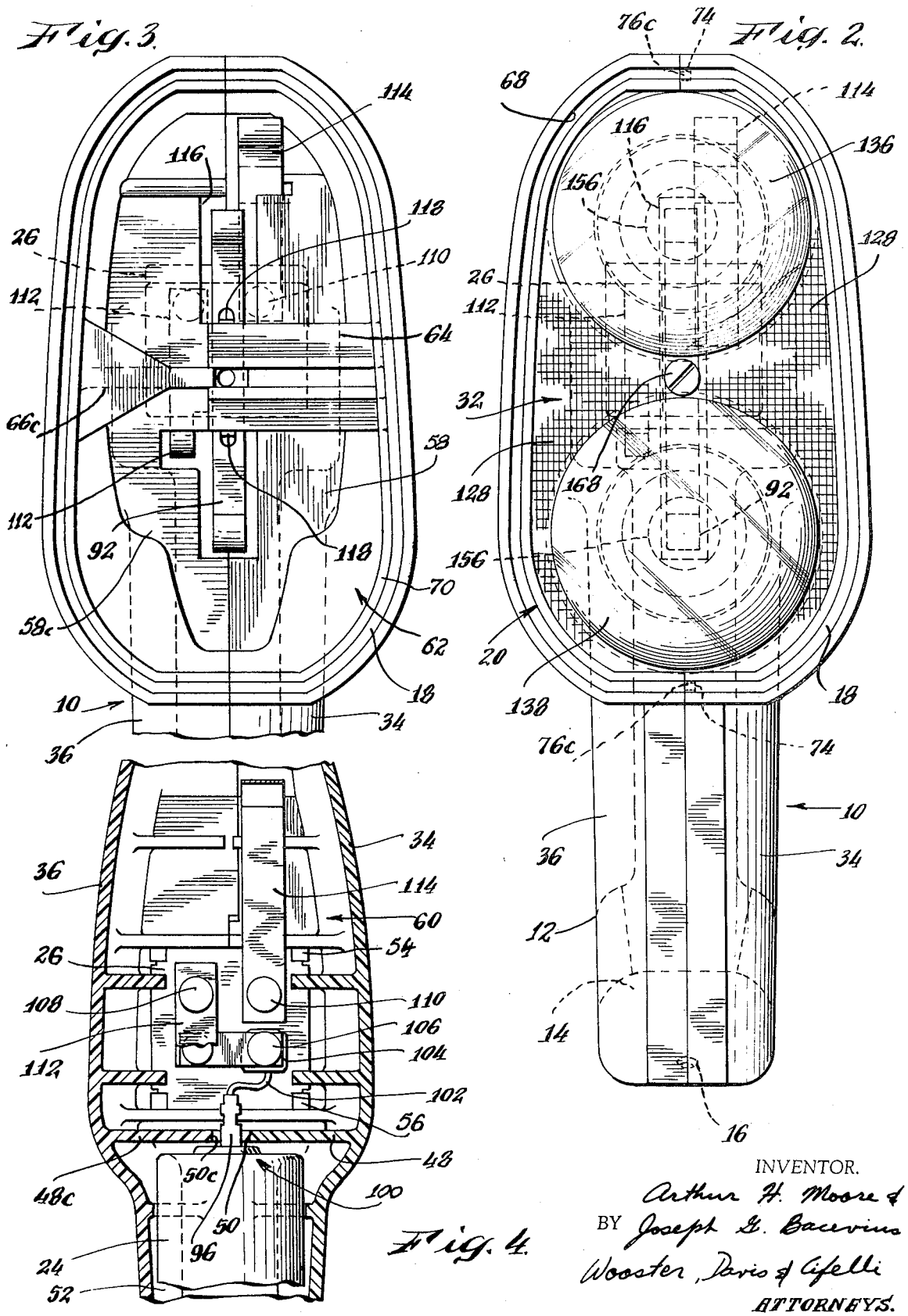

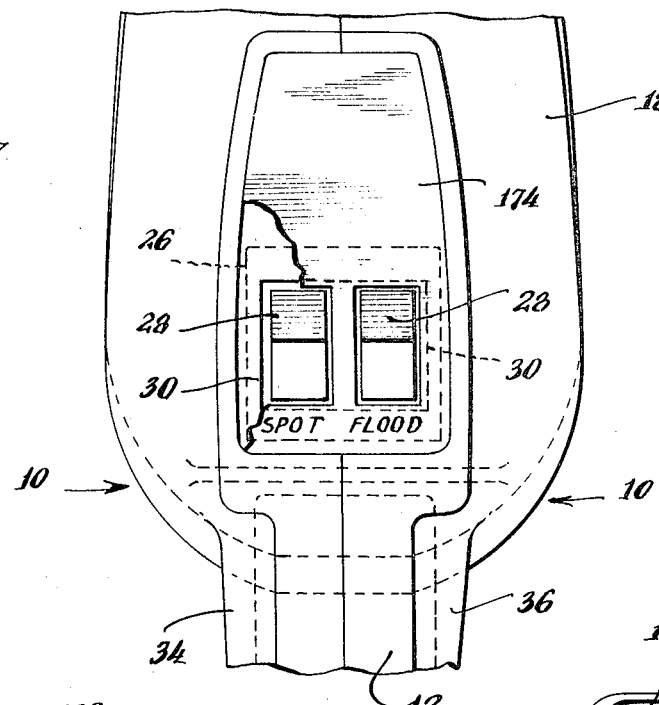
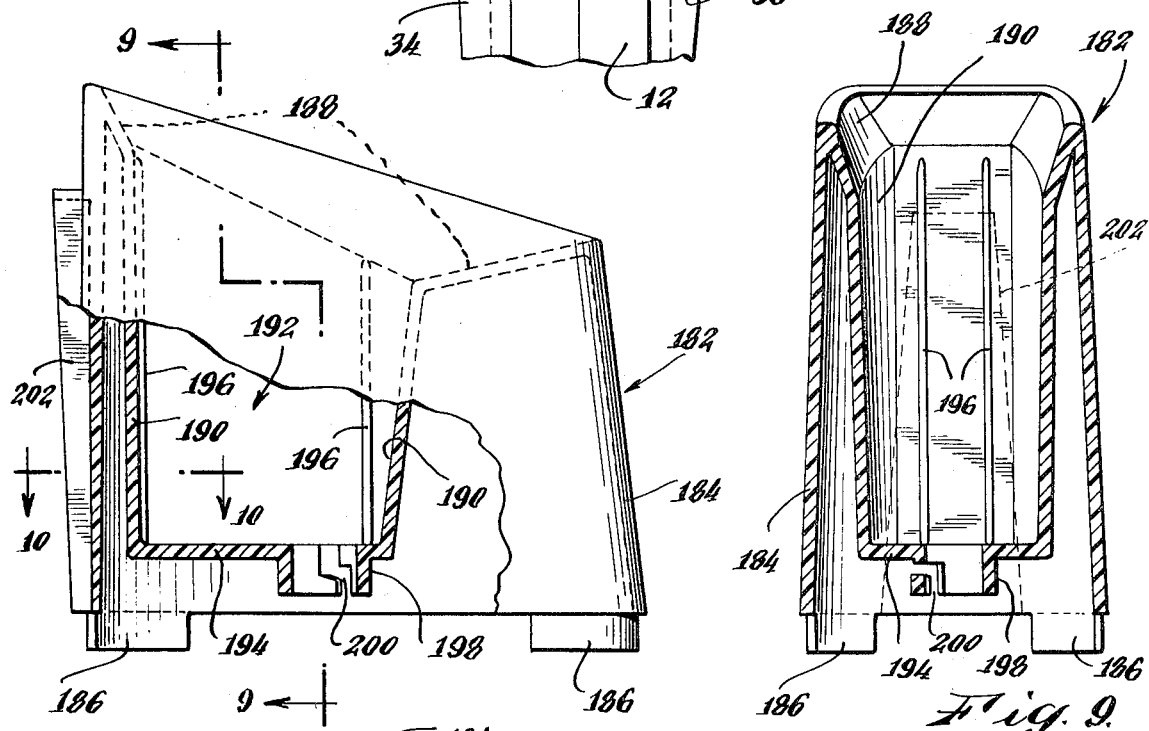
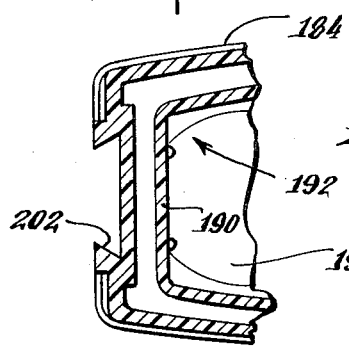

United States Patent Office 3,517,185
Patented June 23, 1970

3,517,185
RECHARGEABLE FLASHLIGHT AND RECHARGING STAND
Arthur H. Moore, Fairfield, and Joseph G. Bacevius, Bridgeport, Conn., assignors to The Bridgeport Metal Goods Manufacturing Company, Bridgeport, Conn., a corporation of Connecticut
Filed Jan. 15, 1968, Ser. No. 697,750
Int. Cl. F21l 1/00
U.S. Cl. 240—10.63     7 Claims

ABSTRACT OF THE DISCLOSURE

A rechargeable flashlight having a pistol grip handle portion within which is housed a rechargeable battery, and an enlarged reflector head portion which receives a dual reflector assembly including a "spot" light and a "flood" light. Switch means is disposed within the body of the flashlight and wired to the rechargeable battery and the spot light and the flood light. The flashlight body is compartmented with internal wall formations to form a battery chamber and isolate the switching and wiring areas of the flashlight body from the spot light and flood light. The portion of the wiring means connecting the switch means to the spot light and flood light being separable to permit removal of the lights.

BACKGROUND OF THE INVENTION

This invention relates to a rechargeable flashlight and more particularly to such a device having dual reflectors.

In recent years rechargeable batteries have been greatly improved and have gained widespread commercial acceptance. Many useful electrically powered devices which formerly utilized standard dry cell batteries are now incorporating rechargeable batteries because they are longer lasting, their power being renewable many times.

Commercially available flashlights incorporating rechargeable batteries are generally of two types. One is a two part device incorporating a battery unit including a recharging transformer which is detachable from the switch-reflector unit and is coupled thereto by means of a standard two blade wall plug. In order to recharge the battery unit it is necessary to separate it from the switch-reflector unit and plug it into a usual wall outlet. Since this device must be plugged into a wall outlet it must meet highly restrictive specifications prescribing the dimensions and location of the center of mass of the battery unit in order to satisfy Underwriters Laboratories' standards. Therefore, it should be understood that the design of this type of battery unit is not determined solely by its performance and power characteristics. This type of flashlight has the further disadvantage that the frequent separation of the units for recharging causes the two units to become loose resulting in a poor electrical connection and ultimately the inability to couple the units so that one may easily be lost. The second type of prior art rechargeable flashlight includes a sealed housing with a handle portion within which the battery and a recharging transformer are located. It will be readily understood that although this unitary flashlight is superior to the two-part prior art flashlight described above it has the decided disadvantage of utilizing a portion of the limited handle volume to house the relatively heavy transformer. Thus, the battery must be reduced in size and weight for a given body size, resulting in a decrease in the potential power of the flashlight.

SUMMARY OF THE INVENTION

Accordingly, it is a primary object of our invention to provide a single unit flashlight incorporating a rechargeable battery sealed within a battery chamber located in the handle thereof wherein the battery chamber is exclusively appropriated to receive a maximum power heavy duty rechargeable battery and in which the recharging power transformer/rectifier is located wholly outside the flashlight body within a recharging plug.

Another object of our invention is to provide a rechargeable flashlight having a comfortable pistol grip, to insure accurate aim and comfort in handling.

Yet another object is to provide a rechargeable flashlight with a dual reflector assembly including a spotlight having a coherent light intensity beam particularly adapted for distance use and a floodlight for producing a broad diffused beam of light particularly adapted for close use, the dual reflector assembly being designed to be easily removable for lamp replacement.

Still another object is to provide a rechargeable flashlight including a recharging stand having a unique fitting to selectively receive a recharging cord.

To accomplish several of these objects in one form, a rechargeable flashlight is provided which includes a unitary body having a pistol grip handle and an enlarged reflector head portion whose axis is angularly disposed with respect to the axis of the handle portion. The handle houses a rechargeable battery sealed therein within a smaller battery chamber and a dual reflector assembly is removably secured within the enlarged reflector head. a dual switch device which is also permanently sealed within the body, is electrically connected to the battery and controls the illumination of selectively illuminable lamps positioned in the dual reflector assembly.

BRIEF DESCRIPTION OF THE DRAWINGS

Other objects and further details of that which we believe to be novel and our invention will be clear from the following description and claims taken with the accompanying drawings wherein:

FIG. 1 is a side elevational view of our flashlight with one half of the housing removed to reveal the internal construction thereof;

FIG. 2 is an elevational view of our novel flashlight taken substantially in the direction of line 2—2 of FIG. 1 showing the dual reflector assembly;

FIG. 3 is a partial elevational view similar to FIG. 2 with the dual reflector assembly having been removed;

FIG. 4 is a sectional view taken substantially along line 4—4 of FIG. 1;

FIG. 5 is a sectional view taken substantially along line 5—5 of FIG. 1;

FIG. 6 is a sectional view taken substantially along line 6—6 of FIG. 1 showing the battery chamber and the recharging station;

FIG. 7 is a view taken substantially in the direction of line 7—7 of FIG. 1 showing the actuating switch buttons;

FIG. 8 is a side elevational view of the recharging stand of our invention partially broken away to show the recharging jack-coupling means;

FIG. 9 is a sectional view taken substantially along line 9—9 of FIG. 8;

FIG. 10 is a sectional view taken substantially along line 10—10 of FIG. 8 showing the mounting means;

FIG. 11 is a perspective view showing the recharging jack of our invention with the coupling sleeve mounted thereon;

FIG. 12 is a side elevational view partially broken away showing the jack and coupling sleeve; and FIG. 13 is a side elevational view of our novel flashlight seated in the recharging stand.

DESCRIPTION OF THE PREFERRED EMBODIMENT

Turning now to the drawings, our novel flashlight indicated generally by the numeral 10 is illustrated in FIGS. 1-7. The flashlight comprises a split housing made of a suitable moldable plastic material formed with a pistol grip handle 12 having a substantially planar base 14 defining an opening 16 therethrough and an enlarged reflector head 18 having an opening 20. The handle 12 encloses a recharging station 22 adjacent the opening 16 and a rechargeable battery 24 comprising one or more cells preferably of the nickel-cadmium type which are firmly held in place within the handle by means of a suitable adhesive. The reflector head 18 encloses a usual dual switch 26 having actuating buttons 28 extending through an opening 30 in the rear thereof and a dual reflector assembly 32 disposed in the opening 20.

The split housing comprises mating halves joined together on a longitudinal centerline (note FIG. 2) including a retainer half 34 which receives the various flashlight components during assembly, and a cover half 36. The housing halves 34 and 36 are substantially mirror images; therefore, only the retainer half 34 will be described in detail and similar portions of the cover half 36 will be denoted by a subscript c attached thereto.

The halves 34 and 36 are formed with interior ribs to compartmentalize and rigidify the housing. In this manner, the circuit elements enclosed in the flashlight 10 are securely retained and are separated to prevent short circuits and shock hazards. A first L-shaped rib 38 located at the recharging station 22 with its longer leg 40 in substantial alignment with the opening 16 is straddled by ribs 42 and 44, the shorter leg 46 extending from the interior of the handle 12 toward the forward exterior wall. A second, larger, L-shaped rib 48 forming an extension of the rib 42 defines a cut-out 50 in its shorter leg and cooperates with the rib 48c of the cover half to form a battery retaining chamber 52 (note FIG. 6). Formations 54 and 56 located adjacent the opening 30 support and position the dual switch 26. A generally vertical rib 58 (as viewed in FIG. 1) separates a rear switch and wiring area 60 from a forward reflector area 62. A fastener box formation 64 on the retainer half 34 cooperates with a rib formation 66c on the cover half 36 (note FIG. 3) to secure a suitable fastener 170 and prevent it from being dislodged. A tapered lip 68 terminating in an inwardly directed flange 70 defines the opening 20 in the reflector head.

The halves 34 and 36 include stepped exterior walls 72, 72c which may be secured with a suitable adhesive and positioning means comprising holes 74 and positioning pins 76c (note FIG. 2).

The housed circuit elements include a negative recharge contact strip 78 and a positive recharge contact strip 80 located at the recharging station 22. The strips which are formed with detents 82 and 84 and terminal detents 86 and 88 are securely friction mounted between the longer leg 40 of the L-shaped rib 38 and the straddling ribs 42 and 44, detents 82 and 84 prevent their longitudinal movement and terminal detents 86 and 88 capture the coaxial post of a usual recharging jack 176. Negative recharge contact strip 78 is electrically connected to the negative pole 89 of battery 24 by a shunt strip 90 and is also electrically connected to a double contact strip 92 by the conductive wire 94. Positive contact strip 80 is electrically connected to a positive shunt strip 96 by wire 98. One end of the shunt strip 96 is secured to the positive pole 100 of battery 24 and the other end extends through the opening 50, 50c. A conductive wire 102 terminating in an eyelet 104 electrically connects the positive pole 100 to the input terminal 106 of the dual switch 26.

The dual switch 26 includes output terminals 108 and 110 to which are respectively secured "flood" contact strip 112 and "spot" contact strip 114. The three lamp contact strips 92, 112 and 114 are in the form of resilient metal members which extend through an elongated opening 116 defined in the vertical wall 58, 58c (note FIG. 3). Double contact strip 92 is retained in position adjacent the rear wall of the fastener box 64 by means of lanced out securing tabs 118 bent normal to the longitudinal dimension of the strip which straddle the box 64.

The dual reflector assembly 32 includes a molded plastic dual reflector member 120 having a "spot" reflector 122 with a highly reflective metallized coating on its surface and a slightly larger "flood" reflector 124 having a stippled metallic coating on its surface. An opening 126 is defined in planar wall 128 between the reflectors to pass a securing screw 168. The assembly 32 further includes a molded plastic dual lens member 130 having a peripheral flange 132 to intimately receive the reflector member 120, and a central opening 134 to pass the securing screw 168. The upper lens, as viewed in FIG. 2 is the "spot" lens 136 which is concavo-convex in form, and the lower lens is the "flood" lens 138 which is convex in order to obtain further diffusion of the reflector diffused light beam. The planar face wall 128 around the reflectors 122 and 124 may be imprinted with information or a decorative design during the molding process. Alternatively, the face design may merely be interposed between the reflector member 120 and the lens member 130 allowing the design to be easily changed by separating the reflector and lens members and replacing the sheet of decorative material.

The concave reflectors 122 and 124 each have a central opening 140 defined through a hub 142 having a lamp positioning flange 144 at one end. Secured to each plastic reflector hub is an electrically conductive member 146 comprising a conductive flange 148 at one end, a sleeve 150 disposed contiguous to the inner diameter of the hub 142 and having internal threads 152, and a spun over mounting portion 154 formed over the lamp positioning flange 144. A usual lamp 156 having a conductive flange 158 connected to one of the lamp terminals is positionable within the hub, the flange 158 being in contact with the electrically conductive member 146. A lamp retainer 160 made of a non-conductive plastic material is in the form of a sleeve having external threads 162, a knurled portion 164 at one end and a rim 166 at its other end. As the retainer engages the threads 152 the rim 166 thereof urges the lamp flange 158 against the conductive member 146 to insure a good electrical contact.

The complete reflector assembly 32 is mounted in the opening 30 by urging the lens flange 132 against the housing flange 70 and holding it in place by means of an elongated securing screw 168 threadedly engaged with fastener 170 held in the fastener box 64. With the reflector assembly 32 so positioned, the resilient "spot" contact strip 114 makes electrical contact with the "spot" conductive flange 148, the resilient "flood" contact strip 112 makes electrical contact with the "flood" conductive flange 148, and the resilient double contact strip 92 makes contact with both central lamp terminals 172. Moreover, the resilient double contact strip 92 is formed to urge the reflector assembly outwardly out of the flashlight body against the securing screw, so that when the screw 168 is removed the reflector asembly "pops" out of the body into the hand of the user. Thus, the user need not pry the reflector out, which may result in damage to the plastic body.

The unique pistol grip shape of the flashlight 10 allows it to be comfortably hand held for accurate aiming. The weight distribution of the rechargeable battery 24 within the body causes the handle to "cling" to the user's hand, eliminating the need to grip it tightly, and it should now be apparent that when hand held the actuating buttons 28 are easily manipulable with the user's thumb. A cover plate 174 having openings for passing the actuating butons 28 is secured to the flashlight adjacent the dual switch and has suitable indicia, "SPOT" and "FLOOD" imprinted thereon (note FIG. 7).

The "spot" power output circuit includes the following elements which are electrically connected: the positive pole 100 of the rechargeable battery 24; positive shunt strip 96; wire 102; eyelet 104; input terminal 106 of the dual switch 26; "spot" output terminal 110, contact strip 114, conductive flange 148, sleeve 150, lamp conductive flange 158, lamp filament, and central lamp terminal 172; double contact strip 92; wire 94; negative shunt strip 90, and the negative pole 89 of the battery. In order to energize the "spot" lamp it is merely necessary to move the "spot" actuating button 28 as indicated by the lengend on the cover plate 174 to the ON position to close the open circuit in the usual dual switch 26. The "flood" lamp is energized through a similar circuit, but including "flood" elements, such as "flood" contact strip 112.

The recharging circuit includes the following electrically connected elements: negative recharge contact strip 78, negative shunt strip 90, the negative battery pole 89, the positive battery pole 100, positive shunt strip 96, wire 98, and positive recharge contact strip 80. Recharging of the battery is accomplished by inserting the coaxial post of a usual jack 176 into the opening 16 to contact the contact strips 78 and 80. It should be noted in FIG. 13 that the jack 176 is located at one end of a recharging wire 178 which carries at its other end a transformer/rectifier plug 180 which may be plugged into any 120 v. AC outlet. In this manner the heavy transformer is not positioned within the flashlight so that the major portion of the handle 12 may house the large, heavy duty, nickel-cadmium, rechargeable battery 24.

In FIGS. 8–10 and 13 we have illustrated a recharging stand 182 uniquely adapted to receive our novel flashlight 10 and to be counter or wall mounted. The stand is preferably molded of plastic and includes a generally rectangular, vertical exterior wall 184 having spaced feet 186 formed at its corners, an inwardly tapered top wall 188, an inner wall 190 defining a chamber 192 tapered to receive the handle 12 and terminating in an interior planar base 194. Spaced friction ribs 196 may be formed on the interior wall 190 to hold the handle 12 firmly in the chamber 192 and to properly position it relative to a jack receiving boss 198 which depends from the planar base 194. The boss defines an axial opening therethrough, and has diametrally opposed dog-leg slots 200 which define a "bayonet-type" coupling. The stand 182 further includes a dovetail mounting formation 202 extending along one wall, designed to receive a wedge-shaped mounting bracket (not shown) in a usual manner.

In order to facilitate recharging of the flashlight, the jack 176 may be removably mounted in the boss 198 so that it is merely necessary to deposit the flashlight handle in the chamber 192 for the coaxial post of the jack to enter the opening 16. A securing collar 204 made of a suitable plastic material is molded upon the jack 176 and includes a wedge shaped locking flange 205 which enters a complementary circumferential groove formed in the jack so that it is securely mounted thereon. The collar 204 has a knurled gripping portion 206 at one end and diametrally opposed locking lugs 208 extending outwardly therefrom. In this manner the jack may be selectively coupled with the stand by inserting it into the boss 198 with the lugs 208 entering the slots 200 and rotating it to lock it therein. The flashlight 10 may be stored in the stand 182 at all times when not in use, without fear of overcharging, and will be always charged and ready to use when needed.

Having described our invention of a rechargeable flashlight and recharging stand, it should be readily appreciated by those skilled in this art that we have provided a flashlight in which the largest possible rechargeable battery may be housed for a given body design and which is uniquely constructed with safety being a primary consideration. To this end, the battery and wiring is separated from the reflector head and is inaccessible to the user. Moreover, the user may readily gain access to the lamps 156 by merely removing the retaining screw 168 thus allowing the reflector assembly to "pop" out of the reflector head under the bias of the double contact strip.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A rechargeable flashlight comprising: a flashlight body including a handle portion and a reflector head portion; wall means for isolating said portions; a rechargeable battery permanently disposed within said handle portion; a reflector assembly removably mounted within said reflector head including an illuminable lamp; switch means disposed within said flashlight body; conductor means electrically connecting said switch means, said batery and said lamp, said conductor means being separable to permit removal of said reflector assembly; and a recharging station located within said handle portion adjacent said battery and arranged to selectively receive a recharging jack through an opening in said handle portion, said station including means electrically connected to the respective poles of said rechargeable battery and arranged to operatively cooperate with the jack, wherein said reflector assembly includes dual reflectors and dual lamps, and said switch means includes a dual control to selectively energize said lamps; and wherein said conductor means includes: a first conductive wire electrically connecting one pole of said rechargeable battery to said switch means; a first resilient contact strip electrically connecting said switch means to one terminal of one of said lamps; a second resilient contact strip electrically connecting said switch means to one terminal of another of said lamps; a resilient double contact strip securely positioned in said body to engage another terminal of each of said lamps; and a second conductive wire electrically connecting another pole of said rechargeable battery to said double contact strip.

2. The rechargeable flashlight defined in claim 1 wherein said double contact strip urges said reflector assembly out of said reflector head to eject said reflector assembly therefrom.

3. A rechargeable flashlight comprising: a flashlight body including a handle portion and a reflector head portion; wall means for isolating said portions; a rechargeable battery permanently disposed within said handle portion; a reflector assembly removably mounted within said reflector head including an illuminable lamp; switch means disposed within said flashlight body; conductor means electrically connecting said switch means, said battery and said lamp, said conductor means being separable to permit removal of said reflector assembly; and a recharging station located within said handle portion adjacent said battery and arranged to selectively receive a recharging jack through an opening in said handle portion, said station including means electrically connected to the respective poles of said rechargeable battery and arranged to operatively cooperate with the jack, wherein said reflector assembly includes dual reflectors and dual lamps, and said switch means includes a dual control to selectively energize said lamps; wherein: said flashlight body is provided with a plurality of internal wall formations to rigidify the body and to isolate the housed elements including a wall defining a battery chamber in said handle portion and an elongated wall substantially isolating the switch and wiring area of the flashlight from said reflector head portion; the recharging station is located within said handle portion outside of said battery chamber and in axial alignment with said opening in said handle portion, the station including a positive contact strip, a spaced negative contact strip, and means for electrically connecting said strips to the respective poles of said battery; and said conductor means includes a first conductive wire electrically connecting one pole of said rechargeable battery to said switch means, a first resilient contact strip electrically connecting said switch means to one terminal of one of said lamps, a second resilient contact strip electrically connecting said switch means to one terminal of another of said lamps, a resilient double contact strip securely positioned in said body to engage another terminal of each of said lamps, and a second conductive wire electrically connecting another pole of said rechargeable battery to said double contact strip.

4. A rechargeable flashlight comprising: a flashlight body including a handle portion and a reflector head portion; wall means for isolating said portions; a rechargeable battery permanently disposed within said handle portion; a reflector assembly removably mounted within said reflector head including an illuminable lamp; switch means disposed within said flashlight body; conductor means electrically connecting said switch means, said battery and said lamp, said conductor means being separable to permit removal of said reflector assembly; and a recharging station located within said handle portion adjacent said battery and arranged to selectively receive a recharging jack through an opening in said handle portion, said station including means electrically connected to the respective poles of said rechargeable battery and arranged to operatively cooperate with the jack, wherein said reflector assembly includes dual reflectors and dual lamps, and said switch means includes a dual control to selectively energize said lamps; wherein: said body is provided with a plurality of internal wall formations including a wall defining a battery chamber in said handle portion and an elongated wall substantially isolating the switching and wiring area of the flashlight from said dual reflector assembly; said dual reflector assembly includes a spotlight reflector and a floodlight reflector; and a dual lens member having a convex portion adjacent said floodlight reflector and a concavo-convex portion adjacent said spotlight reflector.

5. In combination with the rechargeable flashlight as defined in claim 1, a recharging stand having a flashlight handle receiving chamber and comprising: a base for supporting said flashlight having an opening positioned to be axially aligned with said opening in said handle portion when said flashlight is inserted in said chamber, said base opening being surrounded by a coupling boss defining a fitting to receive a recharging jack.

6. The combination defined in claim 5 further including a recharging cord having a jack with a coaxial post and a securing collar at one end and a transformer-rectifier plug at its opposite end.

7. The combination defined in claim 6 wherein: said fitting is a bayonet fitting; and said securing collar is firmly mounted upon said jack and includes diametrally opposed locking lugs positioned to enter said bayonet fitting to maintain said coaxial post in a position extending into said handle receiving chamber so that it may enter said opening in said handle to recharge said battery when said flashlight is inserted in said stand.

References Cited
UNITED STATES PATENTS

| | | | |
|---|---|---|---|
| 1,233,031 | 7/1917 | Cook | 339—183 |
| 2,053,591 | 9/1936 | Wiley. | |
| 2,257,866 | 10/1941 | Talbot et al. | 240—10.63 |
| 2,385,639 | 9/1945 | Packer et al. | 240—10.67 |
| 2,818,498 | 12/1957 | Foch. | |
| 3,192,378 | 6/1965 | Oldenburger | 240—10.65 |
| 3,281,637 | 10/1966 | Hultquist | 320—2 |
| 3,379,952 | 4/1968 | Tarrson | 320—2 |
| 3,398,271 | 10/1968 | Sakamoto | 240—10.63 |

NORTON ANSHER, Primary Examiner

M. D. HARRIS, Assistant Examiner

U.S. Cl. X.R.

240—10.67